Patented Feb. 19, 1952

2,586,615

UNITED STATES PATENT OFFICE 2,586,615

BLOOM INHIBITED CHOCOLATE

Sherwood Thomas Cross, Elsmere, Del.; dedicated to the People of the United States of America by The Pennsylvania Manufacturing Confectioners' Association, assignee, by mesne assignments No Drawing. Application July 5, 1950,
Serial No. 172,199

31 Claims. (Cl. 99—23)

This invention relates to solid chocolate materials and chocolate coated products. More particularly it relates to confectionery chocolate suitable for the preparation of bars, enrobing, icings, and the like.

It is an object of the present invention to produce a chocolate which is color stable upon storage.

It is another object of the present invention to provide a process of treating chocolate for use as a candy confection or in the preparation of edible products such as candy confections and chocolate coated desserts which is stabilized against discoloration.

It is a further object of the present invention to provide an edible chocolate stabilized against discoloration which does not vary essentially in composition or physical properties from the conventional confectionery materials in commercial usage.

The discoloration of solid chocolate materials during storage is a matter of common experience. Chocolate bars and certain chocolate enrobed confections tend to fade and/or change in color under certain conditions of storage and composition. This phenomenon is known to the trade as "bloom." It may be a "low temperature bloom" which is a grey to light brown hue, or a more pronounced, very tan discoloration known as "high temperature bloom" which occurs under extreme temperative variations rendering the chocolate "heat struck." It is a cause of considerable financial loss and embarassment among manufacturers of such materials. Contrary to popular opinion, "bloom" is not necessarily associated with "staleness." For instance, it has been found that temperature cycling and certain ingredient proportions are factors conducive to "bloom" formation. Thus, a product supplied to a retail merchant in a fresh and wholesome condition is often found to be so faded that its unpalatable appearance makes it unsuitable for sale.

The physical or chemical nature of the change which accompanies this unsightly phenomenon is not known. The taste and technical requirements of the industry preclude any substantial modifications of the chocolate compositions as currently employed. For instance, such a manufacturing process as enrobing is highly sensitive to the melting point and viscosity properties. Furthermore, foreign tastes must be avoided and the characteristic chocolate flavor must be preserved to the satisfaction of the consuming public.

In accordance with the present invention it has been discovered that by the incorporation of minor amounts of certain materials to be described hereinafter within a chocolate product, the tendency to "grey" or "bloom" is greatly reduced without any other noticeable effect upon the appearance or taste of the unstabilized material.

The term "chocolate product" as employed in this application is intended to include the solid or semiplastic food prepared by finely grinding cacao nibs and compositions wherein this material is an essential ingredient. Thus, within the expression is included such material commonly known as "chocolate liquor," "chocolate," "bitter chocolate," "baking chocolate," "cooking chocolate," "chocolate coating" and "bitter chocolate coating"; the alkali treated cacao products known as "Dutch chocolate"; chocolate, saccharine compositions known as "sweet chocolate" or "sweet chocolate coating"; "bittersweet chocolate," "bittersweet chocolate coating," "semi-sweet chocolate" or "semi-sweet chocolate coating" wherein the saccharine ingredient may be sucrose, dextrose, dried corn syrup and the like; and the chocolate liquor, milk solids, saccharine compositions commonly known as "milk chocolate," "sweet milk chocolate," "milk chocolate coating," "sweet milk chocolate coating," "skim milk chocolate," "buttermilk chocolate" and "mixed dairy product chocolates." Furthermore, compositions made from sweet chocolate or cocoa and fats other than cacao fat are intended by the generic term. In these latter compositions the cacao fat is replaced in part by one or a mixture of two or more vegetable food oils or fats other than cacao fat, which may be hardened or hydrogenated. Such coatings are employed primarily to obtain variations in melting point.

The chocolate and chocolate compositions as described above may contain additives as spice, ground vanilla beans, any natural food flavoring oil, oleoresin or extract, vanillin, ethyl vanillin, coumarin, or other artificial food flavoring, butter, milk fat, dried malted cereal extract, ground coffee, ground or whole nut meats, salt, and viscosity modifiers such as lecithin.

The stabilizing ingredient which is incorporated within the chocolate composition in accordance with the present invention comprises a combination of a long chain fatty acid partial ester, of a polyhydroxylic material and a polyoxyalkylene ether of a partial ester of a long chain fatty acid ester of a polyhydroxylic material. The esters of the fatty acids which are particularly effective are those containing at least 12 carbon atoms in the fatty acid radical, such as those obtainable by the hydrolysis of natural fats, oils and waxes. Suitable polyhydroxylic compounds include glycerol and polyglycerols; pentaerythritol; pentitols; hexitols and the cyclic ethers thereof; cyclitols such as inositol; oligosaccharides such as glucose, sucrose and lactose; and the glycol and lower polyglycol ethers of such polyhydroxylic compounds. Partial esters of fatty acids containing from 12 to 18 carbon atoms such as those of lauric, palmitic, stearic and oleic acid with hexitols and the cyclic ethers thereof have been found particularly effective. These partial esters may be prepared by one of several known methods; such as by direct esterification of the polyhydroxy material with the free fatty acid or by alcoholysis of naturally occurring esters with polyhydroxy material, using suitable catalyst. The polyoxyalkylene ethers of the partial esters may be prepared by heating any of the partial esters with a preformed polyalkylene glycol or with alkylene oxide in the presence of a suitable catalyst. Derivatives suitable in the present instance include those containing an average of 4 to 40 polyoxyalkylene groups per mol. The preferred derivatives are the polyoxyethylene partial esters of the higher fatty acids containing from 12 to 18 carbon atoms with hexitols and the cyclic ethers thereof, the average number of oxyethylene groups per mol being between 15 and 30. Both the partial esters and their polyalkylene ether derivatives are well known and their preparation is described in detail in the prior art.

The combination of partial esters and the polyoxyalkylene derivative of a partial ester is preferably in the ratio of 1:1. However, either component may be present to as much as 80% of the mixture. It has been found that the ratios of 40:60; 50:50 and 60:40 of partial ester to polyoxyalkylene partial ester are particularly effective. These combinations are effected by simply mixing the components with stirring at room temperature in the desired proportions. The components are either oily liquids or waxy solids. If one or both components is a solid, the solid component is melted prior to combination followed by mixing with stirring at the elevated temperature. Concentration of the inhibitor may be as high as 5%, however, a preferred range is 0.5 to 1.0% based on the weight of the chocolate composition.

In the preparation of the cholocate composition, a solid chocolate of conventional commercial origin is melted and the inhibitor is added in the liquid or molten state in the desired proportions with constant stirring. The mass is then tempered following the usual procedure. Such chocolate is available for the dipping of centers, or it may be cast into molds for the production of chocolate bars.

In the evaluation of materials for use as bloom inhibitors, three types of test were employed to accelerate the bloom. These involved storage at elevated temperature below the melting point, storage with a temperature cycle, and storage at room temperature for extended periods to simulate shelf ageing. In each instance a control sample of uninhibited chocolate from the same source as that treated was exposed to the test conditions. Since lecithin is a common ingredient of many chocolates, some control samples contained lecithin as noted.

While the examples are limited to chocolate bars and various coated candy centers, it is apparent that the concept is available for much broader applications. Thus, the chocolate may be ground or in the form of chip or powder. The coatings may be applied to any form of edible product such as upon cakes, fruit, ice cream and the like.

The following examples are cited to illustrate the invention and are not intended to limit it in any way.

*Example I*

A chocolate bar containing 1.0% of a mixture of sorbitan monostearate and polyoxyethylene sorbitan monostearate containing an average of 20 oxyethylene groups per mol in a 50/50 ratio, was prepared by melting 300 grams of bittersweet chocolate at 50° C., and adding 3 grams of the stabilizer to the molten mass with constant stirring. The molten material was tempered by gradual cooling to 25.5° C., holding this temperature for ten minutes and raising to a holding temperature of 30° C. A bar 3¼ x 1¾ x ½ inches was cast from the melt. The bar was passed through a cooling tower in 40 minutes where the temperature of the entering air was 11° C. It was allowed to stand 24 hours at 25° C. It was then stored at a temperature of 32° C., for a period of 90 hours, followed by cooling to 20° C. At the end of this time the bar showed no sign of bloom, a very slight loss of gloss and excellent snap.

Other bars were prepared containing the same additives in proportions of 80/20, 60/40, 40/60 and 20/80 and in each case the bar was of satisfactory appearance, essentially unchanged in appearance, snap or taste. Both the blank sample of untreated bitter-sweet chocolate and a bittersweet chocolate bar containing 1.0% lecithin bloomed badly under the test conditions.

*Example II*

A chocolate bar was prepared from bitter-sweet chocolate which contained 1.0% of a mixture of sorbitan monolaurate and polyoxyethylene sorbitan monolaurate containing an average of 20 oxyethylene groups per mol in a 50/50 ratio. The additive was blended with constant stirring to the molten chocolate. The composition was tempered, cast, cooled and aged following the sequence described in Example I. This sample, along with similarly prepared bitter-sweet chocolate bars containing no additive and one containing lecithin, was stored for 90 hours at 32.5° C. The bar with no additive as well as the one with the lecithin showed very decided surface blooming and possessed poor snap. The inhibited bar was unaffected.

Example III

Chocolate bars were prepared from milk chocolate containing 1.0% of the five additives as outlined in Example I above. The additives were blended to the molten chocolate. The composition was tempered, cast, cooled and aged following the procedure of Example I. Bars containing no additive or containing 1.0% lecithin were similarly prepared for comparison. After 24 hours of storage at 36° C., a pronounced bloom was apparent on the pure milk chocolate and lecithin milk chocolate bars. Those bars, inhibited in accordance with the present invention, displayed no change.

Example IV

The following additives were prepared by mixing the partial ester and the polyoxyethylene partial ester in the proportions indicated with constant stirring:

| Additive | Partial Ester | Per Cent | Polyoxyethylene Partial Ester | Per Cent |
|---|---|---|---|---|
| A | sorbitan monostearate | 65 | Polyoxyethylene sorbitan monolaurate containing an average of 20 oxyethylene groups per mol. | 35 |
| B | do | 65 | Polyoxyethylene sorbitan monostearate containing an average of 20 oxyethylene groups per mol. | 35 |
| C | do | 60 | Polyoxyethylene sorbitan monooleate containing an average of 20 oxyethylene groups per mol. | 40 |
| D | sorbitan tristearate | 15 | Polyoxyethylene sorbitan monooleate containing an average of 20 oxyethylene groups per mol. | 85 |
| E | do | 45 | Same as B | 55 |
| F | sorbitan monostearate | 30 | Same as D | 70 |
| G | sorbitan monopalmitate | 75 | Polyoxyethylene sorbitan monopalmitate containing an average of 20 oxyethylene groups per mol. | 25 |

Chocolate bars were prepared following the procedure of Example I using a bitter-sweet chocolate and 1% by weight of the additives. Accelerated storage tests were conducted at cycling temperatures of 35–15° C. The bars were examined at the end of 24 and 48 hour intervals. The observations are as listed:

| Bar | 24 hours | 48 hours |
|---|---|---|
| A | v. slight greying | slight greying. |
| B | no visible change | no visible change. |
| C | do | Do. |
| D | do | Do. |
| E | v. slight greying | Do. |
| F | do | v. slight greying. |
| G | slight loss of gloss | Do. |
| H [1] | v. bad bloom | v. bad bloom. |

[1] No additive, control sample.

Example V

Nut, coconut cream and vanilla cream centers were coated with the following compositions by a hand dipping process. They were cooled for a period of 24 hours at 25° C., prior to testing.

A. Bitter-sweet chocolate with no additives.

B. Bitter-sweet chocolate containing 0.5% of a mixture of sorbitan monostearate and polyoxyethylene sorbitan monostearate containing an average of 20 oxyethylene groups per mol, in a ratio of 50/50.

C. Bitter-sweet chocolate containing 1.0% of the additive of B above.

D. Bitter-sweet chocolate containing 1.0% of the additive of B above in a ratio of 40/60.

E. Bitter-sweet chocolate containing 1.0% of the additive of B above, in a ratio of 60/40.

These fifteen chocolate coated centers were then exposed to the following temperature cycles:

| Cycle Number | Hours at 29 °C. | Hours at 18° |
|---|---|---|
| 1 | 18 | 6 |
| 2 | 18 | 6 |
| 3 | 64 | 6 |
| 4 | 18 | 6 |
| 5 | 18 | 6 |
| 6 | 18 | 6 |
| 7 | 64 | 6 |
| 8 | 18 | 6 |
| 9 | 44 | 4 |
| 10 | 64 | 6 |

A slight bloom developed in the uninhibited samples after the fifth cycle. It grew rapidly worse and after the eighth cycle, these candies were considered unsalable.

Of the treated samples, only B above showed any change whatsoever. A slight loss of gloss was apparent after nine cycles, but the sample was still marketable. No change in gloss or color was apparent in the other samples during the 10 complete cycles.

Example VI

A second set of 15 chocolate coated centers as described in Example V, and prepared simultaneously with them, were sealed in a cardboard container and stored at room temperature for a period of three months. The room temperature varied from approximately 65° F. at night to 71° F. during the day. At the end of the storage period, the uninhibited samples had bloomed to a degree that they were unsalable. Of the treated candies no change was noted except that the nut centers showed a slight loss in gloss.

Example VII

Wafers of bitter-sweet chocolate were prepared following the procedure of Example I containing 0.5% of a mixture of sorbitan monostearate and polyoxyethylene sorbitan monooleate containing an average of 20 oxyethylene groups per mol in a ratio of 60/40. These stabilized wafers were sealed in a box along with unstabilized wafers and stored at room temperature for a period of three months. The treated wafers showed no change in appearance or taste. The untreated wafers had bloomed badly.

Example VIII

A bar of Dutch chocolate containing 0.5% of a mixture of sorbitan monostearate and polyoxyethylene sorbitan monostearate containing an average of 20 oxyethylene groups per mol in a ratio of 60/40, was prepared. The bar was subjected to temperatures of 15° and 35° C., in cycles of 12 hours. No change was noticeable in appearance or taste at the end of 144 hours. The blank showed a bad bloom before the 72 hours observation.

*Example IX*

Three bars containing 1.0% of the additives as listed below were prepared from bitter chocolate following the procedure of Example I:

| Sample | Partial Ester | Polyoxyalkylene Partial Ester | Ratio Partial Ester/Polyoxyalkylene Partial Ester |
|---|---|---|---|
| A | Sorbitan monostearate | Polyoxyethylene sorbitan monostearate containing an average of 20 oxyethylene groups per mol. | 60/40 |
| B | do | Polyoxyethylene sorbitan monostearate containing an average of 4 oxyethylene groups per mol. | 20/80 |
| C | do | Polyoxypropylene sorbitan monostearate containing an average of 20 oxypropylene groups per mol. | 50/50 |

The three bars, with a blank containing no additive were stored for a period of 90 hours at a temperature of 32° C. Upon cooling to 20° C., the blank sample was observed to have bloomed badly. The stabilized bars showed no change in appearance, snap or taste.

*Example X*

Six chocolate bars of the compositions as noted below were prepared. Bars labeled A, C and E contained in addition 1.0% of a mixture of sorbitan monostearate and polyoxyethylene sorbitan monostearate containing an average of 20 oxyethylene groups per mol in 60/40 ratio. The bars were subjected to temperatures of 15° and 35° C., in 12 hour cycles. Observations for bloom were made at the end of 72 and 144 hours.

| Sample | Mixing | Liquor to Sugar Ratio | Percent Fat Content | Percent Lecithin | 72 hr. Obervation | 144 hour Observation |
|---|---|---|---|---|---|---|
| A | conched | 1:1 | 33.8 | 0.0937 | good | good. |
| B | do | 1:1 | 33.8 | 0.0937 | fair-poor | v. por. |
| C | do | 1:1 | 31.7 | 0.22 | good | fair-poor. |
| D | do | 1:1 | 31.7 | 0.22 | v. poor | v. poor. |
| E | not conched | 1:1 | 35.0 | 0.22 | v. good | v. good. |
| F | do | 1:1 | 35.0 | 0.22 | poor | v. poor. |

Many modifications that do not depart from the spirit of the above disclosed invention will be apparent to one skilled in the art. Thus, other additives may be presented to alter or control taste and/or viscosity. Also, the bloom inhibition may be combined with special curing techniques and the like.

What is claimed is:

1. A composition of matter comprising chocolate and as a bloom inhibitor at least 0.5 per cent of a mixture of a fatty acid ester and a polyoxyalkylene fatty acid ester.

2. A composition of matter comprising chocolate and as a bloom inhibitor at least 0.5 per cent of a mixture of a partial ester of a higher fatty acid with a polyhydroxy alcohol and a polyoxyalkylene partial ester of a higher fatty acid with a polyhydroxy alcohol.

3. A composition of matter comprising chocolate and as a bloom inhibitor at least 0.5 per cent of a mixture of a partial ester of an aliphatic fatty acid containing at least 12 carbon atoms with a polyhydroxy alcohol, and a polyoxyalkylene partial ester of a fatty acid containing at least 12 carbon atoms with a polyhydroxy alcohol.

4. A composition of matter comprising chocolate and as a bloom inhibitor at least 0.5 per cent of a mixture of a partial ester of a fatty acid containing at least 12 carbon atoms with a hexitan and a polyoxyethylene partial ester of a fatty acid containing at least 12 carbon atoms with a hexitan.

5. A composition of matter comprising chocolate and as a bloom inhibitor at least 0.5 per cent of a mixture of a partial ester of a fatty acid containing at least 12 carbon atoms with sorbitan, and polyoxyethylene partial ester of a fatty acid containing at least 12 carbon atoms with sorbitan.

6. A composition of matter comprising chocolate and as a boom inhibitor at least 0.5 per cent of a mixture of a partial ester of stearic acid with a polyhydroxy alcohol and a polyoxyethylene partial ester of a fatty acid containing at least 12 carbon atoms with polyhydroxy alcohol.

7. A composition of matter comprising chocolate and as a bloom inhibitor at least 0.5 per cent of a mixture of sorbitan monostearate and a polyoxyethylene partial ester of a fatty acid containing at least 12 carbon atoms with a polyhydroxy alcohol.

8. A composition of matter comprising chocolate and as a bloom inhibitor a mixture of sorbitan monostearate and polyoxyethylene sorbitan monostearate.

9. A composition of matter comprising chocolate and as a bloom inhibitor at least 0.5 per cent of a mixture of sorbitan monopalmitate and a polyoxyethylene partial ester of a fatty acid containing at least 12 carbon atoms with a polyhydroxy alcohol.

10. A composition of matter comprising chocolate and as a bloom inhibitor a mixture of sorbitan monopalmitate and polyoxyethylene sorbitan monostearate.

11. A composition of matter comprising chocolate and as a bloom inhibitor a mixture containing sorbitan monopalmitate and polyoxyethylene sorbitan monopalmitate.

12. A composition of matter comprising chocolate and as a bloom inhibitor a mixture containing sorbitan monostearate and polyoxyethylene sorbitan monolaurate.

13. A composition of matter comprising chocolate and as a bloom inhibitor a mixture containing sorbitan monostearate and polyoxyethylene sorbitan monooleate.

14. A composition of matter comprising chocolate and as a bloom inhibitor at least 0.5 per cent of a mixture containing sorbitan tristearate and a polyoxyethylene partial ester of a fatty acid containing at least 12 carbon atoms with a polyhydroxy alcohol.

15. A composition of matter comprising chocolate and as a bloom inhibitor a mixture of sorbitan tristearate and polyoxyethlene sorbitan monooleate.

16. A composition of matter comprising chocolate and as a bloom inhibitor a mixture of sorbitan tristearate and polyoxyethylene sorbitan monostearate.

17. A composition of matter comprising a confection containing as an essential ingredient a chocolate which is bloom inhibited by at least 0.5 per cent of a mixture of a partial ester of a higher fatty acid with a polyhydroxy alcohol and a polyoxyalkylene partial ester of a higher fatty acid with a polyhydroxy alcohol.

18. A composition of matter comprising a confectionery nut center coated with a chocolate which is bloom inhibited with at least 0.5 per cent of a mixture of a partial ester of a higher fatty acid with a polyhydroxy alcohol and a polyoxyalkylene partial ester of a higher fatty acid with a polyhydroxy alcohol.

19. A composition of matter comprising a confectionery cream center coated with a chocolate which is bloom inhibited with at least 0.5 per cent of a mixture of a partial ester of a higher fatty acid with a polyhydroxy alcohol and a polyoxyethylene partial ester of a higher fatty acid with a polyhydroxy alcohol.

20. A composition of matter comprising chocolate and as a bloom inhibitor a mixture of a partial ester of a higher fatty acid and a polyoxyalkylene derivative of a partial ester of a higher fatty acid with a polyhydroxy alcohol, wherein the ester is a monoester.

21. The composition of matter as defined in claim 20 wherein the polyoxyalkylene derivative is a polyoxyethylene derivative.

22. The composition of matter as defined in claim 21 wherein the partial esters are hexitan partial esters.

23. The composition of matter as defined in claim 22 wherein the higher fatty acids contain from 12 to 18 carbon atoms.

24. A composition of matter comprising chocolate and as a bloom inhibitor a mixture of a partial ester of a higher fatty acid and a polyoxyalkylene derivative of a partial ester of a higher fatty acid with a polyhydroxy alcohol wherein the partial ester is a diester.

25. The composition of matter as defined in claim 24 wherein the polyoxyalkylene derivative is a polyoxyethylene derivative.

26. The composition of matter as defined in claim 25 wherein the partial esters are hexitan partial esters.

27. The composition of matter as defined in claim 26 wherein the higher fatty acids contain from 12 to 18 carbon atoms.

28. A composition of matter comprising chocolate and as a bloom inhibitor at least 0.5 per cent of a mixture of sorbitan monostearate and polyoxyethylene sorbitan monostearate.

29. A composition of matter comprising chocolate and as a bloom inhibitor from 0.5 to 1 per cent of a mixture of sorbitan monostearate and polyoxyethylene sorbitan monostearate.

30. A composition of matter comprising chocolate and as a bloom inhibitor 0.5 per cent of sorbitan monostearate and 0.5 per cent of polyoxyethylene sorbitan monostearate.

31. A composition of matter as described in claim 30 wherein the chocolate is a cocoa-type coating.

SHERWOOD THOMAS CROSS.

REFERENCES CITED

The following references are of record in the file of this patent:

UNITED STATES PATENTS

| Number | Name | Date |
| --- | --- | --- |
| 2,422,486 | Johnston | June 17, 1947 |
| 2,539,518 | Mayberry | Jan. 30, 1951 |